United States Patent Office 2,955,127
Patented Oct. 4, 1960

2,955,127

ORGANOSILICON AMINE OXIDES AND PROCESSES FOR THEIR PRODUCTION

Roscoe A. Pike, Grand Island, N.Y., assignor to Union Carbide Corporation, a corporation of New York No Drawing. Filed Dec. 29, 1958, Ser. No. 783,101

20 Claims. (Cl. 260—448.2)

This invention relates to organosilicon compounds and processes for their production.

This invention provides amine oxides of silanes and siloxanes containing an N,N-dihydrocarbon amino group linked to a silicon atom by a divalent hydrocarbon group wherein the amino group is attached to at least the second carbon atom removed from the silicon atom. More particularly, this invention provides compounds represented by the formula:

$$R_2N(O)C_aH_{2a}SiZ_3 \quad (1)$$

wherein R is a monovalent hydrocarbon group, $a$ has a value of at least two, the $R_2N(O)$— group is attached to at least the second carbon atom removed from the silicon atom and Z is a monovalent hydrocarbon group, an alkoxy group, aryloxy group, a hydroxy group, a siloxy group or a $R_2N(O)C_aH_{2a}$— group. In Formula 1, R can be the same or different and Z can be the same or different. In Formula 1, the —$C_aH_{2a}$— group is preferably a polymethylene chain, $a$ preferably has a value from 3 to 5, and preferably at least two groups represented by Z are alkoxy, aryloxy or siloxy groups. Illustrative of the monovalent hydrocarbon groups represented by R and Z in Formula 1 are the alkyl groups (e.g. the methyl, ethyl and propyl groups) and the aryl groups (e.g. the phenyl group). Illustrative of the alkoxy groups represented by Z in Formula 1 are the methoxy, ethoxy and propoxy groups and illustrative of the aryloxy groups represented by Z is the phenoxy group. Preferably the monovalent hydrocarbon groups as represented by R and Z and the alkoxy and/or aryloxy groups as represented by Z contain from 1 to 18 carbon atoms.

This invention also provides a process for producing compounds represented by Formula 1 which involves forming a mixture of an aminosilicon compound represented by the formula:

$$R_2NC_aH_{2a}SiY_3 \quad (2)$$

wherein R and $a$ have the above-defined meanings and Y is a monovalent hydrocarbon, alkoxy, aryloxy, hydroxy, siloxy or $R_2NC_aH_{2a}$— group and an oxidizing agent and maintaining the mixture at a temperature at which the aminosilicon compound and the oxidizing agent react to produce a compound represented by Formula 1. This process involves a reaction that can be illustrated by the equation:

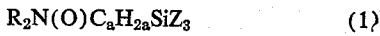

The silanes of this invention can be represented by the formula:

$$R_2N(O)C_aH_{2a}SiZ'_3 \quad (3)$$

wherein R and $a$ have the above-defined meanings and Z' is an alkoxy group, an aryloxy group, a monovalent hydrocarbon group or a $R_2N(O)C_aH_{2a}$— group. In Formula 3, R can be the same or different and Z' can be the same or different. Preferably at least two groups represented by Z' in Formula 3 are alkoxy or aryloxy groups and preferably the —$C_aH_{2a}$— group is a polymethylene group and $a$ preferably has a value from 3 to 5.

The siloxanes of this invention contain at least one group represented by the formula:

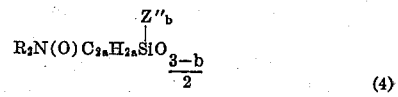

wherein R and $a$ have the above-defined meanings, Z" is a hydroxyl group, an alkoxy group, an aryloxy group, a monovalent hydrocarbon group or a $R_2N(O)C_aH_{2a}$— group and $b$ has a value from 0 to 2, preferably from 0 to 1. In Formula 4, R can be the same or different and Z" can be the same or different. The —$C_aH_{2a}$— group in Formula 4 is preferably a polymethylene group and $a$ preferably has a value from 3 to 5.

The siloxanes of this invention can contain, in addition to groups represented by Formula 4, groups represented by the formula:

wherein R' is a monovalent hydrocarbon group and $c$ has a value from 0 to 3, preferably from 1 to 2. In Formula 5, R' can be the same or different. Illustrative of the groups represented by R' in Formula 5 are the alkyl groups (e.g. the methyl, ethyl and propyl groups), the aryl groups (e.g. the phenyl groups), the alkenyl groups (e.g. the vinyl and the butenyl groups), the cycloalkenyl groups (e.g. the cyclohexenyl groups), the cycloalkyl groups (e.g. the cyclohexyl group) and the aralkyl groups (e.g. the beta-phenylethyl group).

Suitable oxidizing agents include hydrogen peroxide, perbenzoic acid, peracetic acid and the like. The preferred oxidizing agent is hydrogen peroxide, especially when the aminosilicon compound contains olefinically unsaturated groups. Perbenzoic acid and peracetic acid oxidize such unsaturated groups and so are less desirable oxidizing agents when the aminosilicon compound contains such groups. Olefinically unsaturated groups are unaffected by hydrogen peroxide.

Suitable starting silanes can be represented by the formula:

$$R_2NC_aH_{2a}SiY'_3 \quad (6)$$

wherein R and $a$ have the above-defined meanings and Y' is an alkoxy, aryloxy, monovalent hydrocarbon or $R_2NC_aH_{2a}$— group. Illustrative of the silanes represented by Formula 6 are N,N-diphenyl-gamma-aminopropyltriethoxysilane, N,N - dimethyl - delta - aminobutyl (methyl)diethoxysilane, N-methyl, N - phenyl - epsilon-aminopentyl(dimethyl) - ethoxysilane, N,N - dimethyl-gamma-aminopropyl(trimethyl)silane, bis(N,N - diethyl-gamma-aminopropyl)diethoxysilane and the like.

Suitable starting siloxanes contain at least one group represented by the formula:

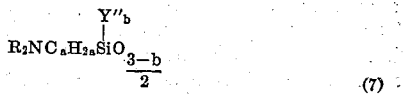

wherein R, $a$ and $b$ have the above-defined meanings, and Y" is a hydroxyl, alkoxy, aryloxy, monovalent hydrocarbon or $R_2NC_aH_{2a}$— group. In Formula 7, R and Y" can be the same or different. Illustrative of the siloxane groups represented by Formula 7 are the N,N-diphenyl-gamma-aminopropylsiloxy, N,N-dimethyl - delta - aminobutyl(methyl)siloxy, N-methyl, N-phenyl-epsilon-aminopentyl(dimethyl)siloxy and bis(N,N - diethyl - gamma-aminopropyl)siloxy groups and the like. Suitable starting siloxanes can contain, in addition to groups represented by Formula 7, groups represented by Formula 5.

Suitable starting aminosilicon compounds can be produced by forming a mixture of a chlorohydrocarbylsilicon compound and a secondary amine and heating the mixture to a temperature sufficiently elevated to cause the chlorohydrocarbylsilicon compound and the amine to react. This reaction can be represented by the formula:

$$R_2NH + ClC_aH_{2a}Si\equiv \rightarrow R_2NC_aH_{2a}Si\equiv + HCl \quad (8)$$

wherein the R and $a$ have the above-defined meanings.

Amounts of the oxidizing agent from 2 to 10 times the amount required to oxidize the starting aminosilicon compound to produce the corresponding amine oxide are useful but amounts from 5 to 6 times the amount required to oxidize the starting aminosilicon compound are preferred. No particular advantage is gained by using other amounts of the reactants. Any excess oxidizing agent can be decomposed after the amine oxide has been formed by adding to the reaction mixture a reducing agent such as platinum or palladium either alone or supported on another material such as gamma-alumina or carbon.

The starting aminosilicon compound and the oxidizing agent can be maintained at a temperature from −10° C. to 40° C., or preferably from 20° C. to 35° C. to cause them to react to produce an amine oxide. Although other temperatures can be used, no particular advantage is achieved by so doing.

The reaction of the starting aminosilicon compound and the oxidizing agent can be carried out within a solvent in which they are mutually soluble. Suitable solvents include water, chloroform, methylene chloride, acetone, alcohols, aqueous alcohols and the like. When hydrogen peroxide is the oxidizing agent, the preferred solvent is water. When the solvent employed is water and the starting aminosilicon compound is a silane represented by Formula 6 where at least one group represented by Z' is an alkoxy or aryloxy group, oxidation of the amino group and, to some extent, hydrolysis and condensation of the alkoxy or aryloxy occur to produce a siloxane represented by Formula 4. When perbenzoic acid or peracetic acid is used as the oxidizing agent, anhydrous solvents (e.g. anhydrous chloroform) are used since these acids decompose in water. Amounts of the solvent from 10 parts to 150 parts by weight per 100 parts by weight of the starting aminosilicon compound and oxidizing agent are useful but amounts of the solvent from 15 parts to 20 parts by weight per 100 parts by weight of the reactants are preferred. It is usually not advantageous to use other amounts of the solvent.

The $R_2N(O)C_aH_{2a}$— groups in the compounds of this invention readily decompose on heating to produce alkenyl groups. This decomposition reaction can be represented by the equation:

$$R_2N(O)C_aH_{2a}Si\equiv \rightarrow C_aH_{2a-1}Si\equiv + R_2NOH \quad (9)$$

The decomposition reaction represented by Equation 9 can be brought about by heating the amine oxide at a temperature from 75° C. to 200° C. or preferably at a temperature from 90° C. to 115° C. No particular advantage is gained by employing other temperatures. The R groups present in the amine oxide reacted according to Equation 9 are preferably methyl groups since such amine oxides react at lower temperatures and give better yields of alkenylsilicon compounds than other amine oxides (e.g. amine oxides of N,N-diphenylaminosilicon compounds).

Conversion of tertiary aminosilicon compounds to amine oxides followed by conversion of the amine oxides to alkenylsilicon compounds is a convenient way to make use of such tertiary amines which are often an undesired byproduct in the production of primary and/or secondary aminosilicon compounds. Furthermore, this route can be used to produce alkenylsilicon compounds that are not readily produced by other methods.

The alkenylsilicon produced by the decomposition of the amine oxides of this invention are useful in a wide variety of applications. By way of illustration, the alkenylsiloxanes produced from the siloxanes of this invention can be cured via the alkenyl groups to produce resins or elastomers. As a further illustration, these alkenylsilicon compounds can be blended with other silicone materials and polymerized via the alkenyl groups to provide crosslinking in the other material.

The oxygen atom represented by (O) in Formulas 1, 3 and 4 is bonded only to the nitrogen atom. I do not wish to be bound by any particular theory regarding what type of chemical bond exists between the nitrogen atoms and the oxygen atoms in the compounds of this invention. That is it is possible that these bonds are either of the type denoted by the symbol N→O (in which case my compounds would be represented by the formula:

or of the type denoted by the symbol N=O (in which case my compounds would be represented by the formula:

but I do not wish to be limited to either of these theoretical alternatives. However the N→O type bond appears to be the more likely type.

The compounds of this invention are unstable at elevated temperatures and hence are difficult to analyze as such. Hence in order to identify these compounds it is desirable to first form a salt of these compounds and picric acid and then analyze the salts so formed. These salts can be prepared simply by mixing an alcoholic solution of the amine oxide and an aqueous solution of picric acid.

The following examples illustrate the present invention.

*Example I*

A mixture was formed containing 10 g. of N,N-dimethyl-gamma-aminopropyltrimethylsilane and 20 cc. of methanol. The flask containing the mixture was cooled in ice and 20 g. of an aqueous hydrogen peroxide solution (containing 35 wt.-percent hydrogen peroxide) was slowly added to the flask over a 45 min. period. The solution was allowed to come to room temperature and to stand for 24 hours. The unreacted hydrogen peroxide was decomposed by adding to the flask 2 g. of platinum supported on gamma-alumina (2 wt.-percent platinum) and 2 g. of palladium supported on carbon black (0.5 wt.-percent palladium). The mixture was stirred for 24 hours. The mixture was then filtered and the water was removed from the filtrate so produced by evaporating it at 1 mm. pressure at room temperature. There was so produced 9.5 g. of a semi-crystalline, light green solid that had the formula:

$$Me_2N(O)(CH_2)_3SiMe_3$$

The picrate salt of the latter compound was formed by dissolving 1 g. of the compound in methanol and adding this solution to an aqueous solution containing 1.5 g. of picric acid dissolved in 100 ml. of water. A precipitate formed and was separated from the liquid by filtration. The precipitate was recrystallized from absolute ethanol. There was produced 0.8 g. of a yellow crystalline solid that had the formula:

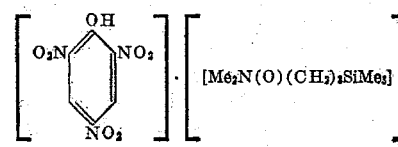

This compound melted at 147–148° C. and had the following analysis:

|  | Theoretical ($C_{14}H_{24}N_4SiO_8$) (wt.-percent) | Found (wt.-percent) |
|---|---|---|
| Carbon | 41.6 | 41.4±0.2 |
| Hydrogen | 6.0 | 6.3±0.2 |
| Silicon | 6.9 | 6.7±0.2 |
| Nitrogen | 13.9 | 14.0±0.2 |

*Example II*

The amine oxide (8.0 g.) produced in Example I was heated in a nitrogen atmosphere at 20 mm. pressure in a flask attached to a Vigreaux column and two traps in series. The first trap was cooled in Dry Ice-acetone mixture and the second in liquid nitrogen. The flask was heated at a rate of 2 to 3° C. per minute. Decomposition of the amine oxide began at 90° C. and was completed at 100° C. No residue remained in the flask. Essentially all of the distillate was collected in the first trap. The distillate collected in the first trap was acidified with 0.1 N hydrochloric acid. The two layers formed: an aqueous layer and an organic layer. The aqueous layer was frozen by immersion in Dry Ice. The organic layer was separated with a pipette and distilled through a semi micro column. There was so produced 4.69 g. of allyltrimethylsilane which had a boiling point of 83–85° C. at 747 mm. and $n_D^{25}=1.4051$. The aqueous layer was melted and the water was volatilized at reduced pressure. Absolute ethanol was added and the ethanol and the residual water was volatilized at reduced pressure. The residue so produced was 2.5 g. of $Me_2NOH \cdot HCl$.

What is claimed is:

1. An amine oxide selected from the group consisting of:

(A) a silane represented by the formula:

$$R_2N(O)C_aH_{2a}SiZ'_3$$

wherein R is a member selected from the group consisting of the aryl groups and the alkyl groups, $a$ has a value of at least two, the $R_2N(O)$— group is attached to at least the second carbon atom removed from the silicon atom and Z′ is a member selected from the group consisting of the alkoxy, aryloxy, monovalent hydrocarbon and $R_2N(O)C_aH_{2a}$— groups and (B) a siloxane containing at least one group represented by the formula:

$$R_2N(O)C_aH_{2a}\underset{\underset{2}{3-b}}{\overset{Z''_b}{Si}O}$$

wherein R is a member selected from the group consisting of the aryl and the alkyl groups, $a$ has a value of at least two, the $R_2N(O)$— group attached to at least the second carbon atom removed from the silicon atom, Z″ is a member selected from the group consisting of the hydroxy, alkoxy, aryloxy, monovalent hydrocarbon and $R_2N(O)C_aH_{2a}$— groups and $b$ has a value from 0 to 2.

2. A silane represented by the formula:

$$R_2N(O)C_aH_{2a}SiZ'_3$$

wherein R is a member selected from the group consisting of the aryl groups and the alkyl groups, $a$ has a value of at least two, the $R_2N(O)$— group is attached to at least the second carbon atom removed from the silicon atom and Z′ is a member selected from the group consisting of the alkoxy, aryloxy, monovalent hydrocarbon and $R_2N(O)C_aH_{2a}$— groups.

3. A silane represented by the formula:

$$Me_2N(O)C_aH_{2a}SiZ'_3$$

wherein the —$C_aH_{2a}$— group is a polymethylene chain, $a$ has a value from 3 to 5, and Z′ is an alkoxy group.

4. A siloxane containing at least one group represented by the formula:

$$R_2N(O)C_aH_{2a}\underset{\underset{2}{3-b}}{\overset{Z''_b}{Si}O}$$

wherein R is a member selected from the group consisting of the aryl and the alkyl groups, $a$ has a value of at least two, the $R_2N(O)$— group attached to at least the second carbon atom removed from the silicon atom, Z″ is a member selected from the group consisting of the hydroxy, alkoxy, aryloxy, monovalent hydrocarbon and $R_2N(O)C_aH_{2a}$— groups and $b$ has a value from 0 to 2.

5. A siloxane containing at least one siloxane group represented by the formula:

$$Me_2N(O)C_aH_{2a}\underset{\underset{2}{3-b}}{\overset{Z''_b}{Si}O}$$

wherein the —$C_aH_{2a}$— group is a polymethylene chain, $a$ has a value from 3 to 5, $b$ has a value from 0 to 1 and Z″ is a monovalent hydrocarbon group.

6. A siloxane containing (1) at least one group represented by the formula:

$$R_2N(O)C_aH_{2a}\underset{\underset{2}{3-b}}{\overset{Z''_b}{Si}O}$$

wherein R is a member selected from the group consisting of the aryl and the alkyl groups, $a$ has a value of at least two, the $R_2N(O)$— group attached to at least the second carbon atom removed from the silicon atom, Z″ is a member selected from the group consisting of the hydroxy, alkoxy, aryloxy, monovalent hydrocarbon and $R_2N(O)C_aH_{2a}$— groups and $b$ has a value from 0 to 2, and (2) at least one group represented by the formula:

$$R'_cSiO_{\frac{4-c}{2}}$$

wherein R′ is a monovalent hydrocarbon group and $c$ has a value from 0 to 3.

7. A compound represented by the formula:

$$Me_2N(O)(CH_2)_3SiMe_3$$

8. A process for producing an amine oxide selected from the group consisting of:

(A) a silane represented by the formula:

$$R_2N(O)C_aH_{2a}SiZ'_3$$

wherein R is a member selected from the group consisting of the aryl groups and the alkyl groups, $a$ has a value of at least two, the $R_2N(O)$— group is attached to at least the second carbon atom removed from the silicon atom and Z′ is a member selected from the group consisting of the alkoxy, aryloxy, monovalent hydrocarbon and $R_2N(O)C_aH_{2a}$— groups and (B) a siloxane containing at least one group represented by the formula:

$$R_2N(O)C_aH_{2a}\underset{\underset{2}{3-b}}{\overset{Z''_b}{Si}O}$$

wherein R is a member selected from the group consisting of the aryl and the alkyl groups, $a$ has a value of at least two, the $R_2N(O)$— group attached to at least the second carbon atom removed from the silicon atom, Z″ is a member selected from the group consisting of the hydroxy, alkoxy, aryloxy, monovalent hydrocarbon and $R_2N(O)C_aH_{2a}$— groups and $b$ has a value from 0 to 2, which process comprises forming a mixture of (1) an aminosilicon compound selected from the group consisting of:

(C) a silane represented by the formula:

$$R_2NC_aH_{2a}SiY'_3$$

wherein R and $a$ have the above-defined meanings and Y' is a member selected from the group consisting of the alkoxy, aryloxy, monovalent hydrocarbon and $$R_2NC_aH_{2a}-$$

groups and (D) a siloxane containing at least one group represented by the formula:

$$R_2NC_aH_{2a}\underset{|}{\overset{Y''}{Si}}O_{\frac{3-b}{2}}$$

wherein R, $a$ and $b$ have the above-defined meanings and Y'' is a member selected from the group consisting of the hydroxyl, alkoxy, aryloxy, monovalent hydrocarbon and $R_2NC_aH_{2a}-$ groups and (2) an oxidizing agent and maintaining the mixture at a temperature from $-10°$ C. to $40°$ C. to cause the aminosilicon compound and the oxidizing agent to react to produce the amine oxide.

9. A process for producing an amine oxide represented by the formula:

$$Me_2N(O)C_aH_{2a}SiZ'_3$$

wherein the $-C_aH_{2a}-$ group is a polymethylene chain, $a$ has a value from 3 to 5, and Z' is an alkoxy group, said process comprising forming a mixture of an aminosilane represented by the formula:

$$Me_2NC_aH_{2a}SiY_3'''$$

wherein $a$ has the above-defined meaning and Y''' is an alkoxy group, an oxidizing agent selected from the group consisting of perbenzoic acid and peracetic acid and an anhydrous solvent in which the aminosilane and the oxidizing agent are soluble and maintaining the mixture at a temperature from $-10°$ C. to $40°$ C. to cause the aminosilane and the oxidizing agent to react to produce the amine oxide.

10. A process for producing an amine oxide free of olefinic unsaturation and containing at least one group represented by the formula:

$$Me_2N(O)C_aH_{2a}\underset{|}{\overset{Z''_b}{Si}}O_{\frac{3-b}{2}}$$

wherein the $-C_aH_{2a}-$ group is a polymethylene chain, $a$ has a value from 3 to 5, $b$ has a value from 0 to 1 and Z'' is a monovalent hydrocarbon group, said process comprising forming a mixture of a siloxane free of olefinic unsaturation and containing at least one group represented by the formula:

$$Me_2NC_aH_{2a}\underset{|}{\overset{Y'''_b}{Si}}O_{\frac{3-b}{2}}$$

wherein the $a$ and $b$ have the above defined meanings and Y''' is a monovalent hydrocarbon group, hydrogen peroxide and water and maintaining the mixture at a temperature from $-10°$ C. to $40°$ C. to cause the latter-mentioned siloxane and the peroxide to react to produce the amine oxides.

11. A process for producing an amine oxide represented by the formula:

$$Me_2N(O)(CH_2)_3SiMe_3$$

which comprises forming a mixture of N,N-dimethyl-gamma-aminopropyltrimethylsilane, hydrogen peroxide and water and maintaining the mixture at a temperature from $20°$ C. to $35°$ C. to cause the latter-mentioned silane and the peroxide to react to produce the amine oxide.

12. A process for producing an alkenylsilicon compound selected from the group consisting of:

(A) an alkenylsilane represented by the formula:

$$C_aH_{2a-1}SiZ''''_3$$

wherein Z'''' is a member selected from the group consisting of the alkoxy, aryloxy, monovalent hydrocarbon and $C_aH_{2a-1}-$ groups and $a$ has a value of at least two and (B) a siloxane containing at least one group representated by the formula:

$$C_aH_{2a-1}\underset{|}{\overset{Z''''_b}{Si}}O_{\frac{3-b}{2}}$$

wherein $a$ has a value of at least two, $b$ has a value from 0 to 2 and Z'''' is a member selected from the group consisting of the alkoxy, aryloxy, monovalent hydrocarbon, hydroxy and $C_aH_{2a-1}-$ groups, which process comprises heating an amine oxide selected from the group consisting of:

(C) a silane represented by the formula:

$$R_2N(O)C_aH_{2a}SiZ'_3$$

wherein R is a member selected from the group consisting of the aryl groups and the alkyl groups, $a$ has a value of at least two, the $R_2N(O)-$ group is attached to at least the second carbon atom removed from the silicon atom and Z' is a member selected from the group consisting of the alkoxy, aryloxyl, monovalent hydrocarbon and $R_2N(O)C_aH_{2a}-$ groups and (D) a siloxane containing at least one group represented by the formula:

$$R_2N(O)C_aH_{2a}\underset{|}{\overset{Z''_b}{Si}}O_{\frac{3-b}{2}}$$

wherein R is a member selected from the group consisting of the aryl and the alkyl groups, $a$ has a value of at least two, the $R_2N(O)-$ group attached to at least the second carbon atom removed from the silicon atom Z'' is a member selected from the group consisting of the hydroxy, alkoxyl, aryloxy, monovalent hydrocarbon and $R_2N(O)C_aH_{2a}-$ groups and $b$ has a value from 0 to 2, to a temperature sufficiently elevated to produce the alkenylsilicon compound.

13. A process for producing an alkenylsilane represented by the formula:

$$C_aH_{2a-1}SiZ''''_3$$

wherein Z'''' is a member selected from the group consisting of the alkoxy, aryloxy, monovalent hydrocarbon and $C_aH_{2a-1}-$ groups and $a$ has a value of at least two, said process comprising heating an aminosilane represented by the formula:

$$R_2N(O)C_aH_{2a}SiZ'_3$$

wherein R is a monovalent hydrocarbon group, $a$ has a value of at least two, the $R_2N(O)$ group is attached to at least the second carbon atom removed from silicon and Z' is a member selected from the group consisting of the alkoxy, aryloxy, monovalent hydrocarbon and $R_2N(O)C_aH_{2a}-$ groups to a temperature from $75°$ C. to $200°$ C.

14. A process for producing a siloxane containing at least one group represented by the formula:

$$C_aH_{2a-1}\underset{|}{\overset{Z''''_b}{Si}}O_{\frac{3-b}{2}}$$

wherein $a$ has a value of at least two, $b$ has a value from 0 to 2 and Z'''' is a member selected from the group consisting of the alkoxy, aryloxy, monovalent hydrocarbon, hydroxy and $C_aH_{2a-1}-$ groups, said process comprising heating a siloxane containing at least one group represented by the formula:

$$R_2N(O)C_aH_{2a}\underset{|}{\overset{Z''_b}{Si}}O_{\frac{3-b}{2}}$$

wherein R is a monovalent hydrocarbon group, $a$ has a value of at least two, the $R_2N(O)$ group is attached to at least the second carbon atom removed from silicon, $b$ has a value from 0 to 2 and $Z''$ is a member selected from the group consisting of the alkoxy, aryloxy, hydroxy, monovalent hydrocarbon and $R_2N(O)C_aH_{2a}$— groups to a temperature from 75° C. to 200° C.

15. A process for producing allyltrimethylsilane which comprises heating a silane represented by the formula: $Me_2N(O)(CH_2)_3SiMe_3$ to a temperature from 90° C. to 115° C.

16. A silane represented by the formula:

$$R_2N(O)C_aH_{2a}SiZ'_3$$

wherein R is a member selected from the group consisting of the aryl groups and the alkyl groups, $a$ has a value of at least three, the $R_2N(O)$— group is attached to at least the third carbon atom removed from the silicon atom and $Z'$ is a member selected from the group consisting of the alkoxy, aryloxy, monovalent hydrocarbon and $R_2N(O)C_aH_{2a}$— groups.

17. A siloxane containing at least one group represented by the formula:

$$R_2N(O)C_aH_{2a}SiO_{\frac{3-b}{2}}^{Z''_b}$$

wherein R is a member selected from the group consisting of the aryl and the alkyl groups, $a$ has a value of at least three, the $R_2N(O)$— group attached to at least the third carbon atom removed from the silicon atom, $Z''$ is a member selected from the group consisting of the hydroxy, alkoxy, aryloxy, monovalent hydrocarbon and $R_2N(O)C_aH_{2a}$— groups and $b$ has a value from 0 to 2.

18. A siloxane containing (1) at least one group represented by the formula:

$$R_2N(O)C_aH_{2a}SiO_{\frac{3-b}{2}}^{Z''_b}$$

wherein R is a member selected from the group consisting of the aryl and the alkyl groups, $a$ has a value of at least three, the $R_2N(O)$— group attached to at least the third carbon atom removed from the silicon atom, $Z''$ is a member selected from the group consisting of the hydroxy, alkoxy, aryloxy, monovalent hydrocarbon and $R_2N(O)C_aH_{2a}$— groups and $b$ has a value from 0 to 2, and (2) at least one group represented by the formula:

$$R'_cSiO_{\frac{4-c}{2}}$$

wherein $R'$ is a monovalent hydrocarbon group and $c$ has a value from 0 to 3.

19. A process for producing an alkenylsilane represented by the formula:

$$C_aH_{2a-1}SiZ''''_3$$

wherein $Z''''$ is a member selected from the group consisting of the alkoxy, aryloxy, monovalent hydrocarbon and $C_aH_{2a-1}$— groups and $a$ has a value of at least three, said process comprising heating an aminosilane represented by the formula:

$$R_2N(O)C_aH_{2a}SiZ'_3$$

wherein R is a monovalent hydrocarbon group, $a$ has a value of at least three, the $R_2N(O)$ group is attached to at least the third carbon atom removed from silicon and $Z'$ is a member selected from the group consisting of the alkoxy, aryloxy, monovalent hydrocarbon and $R_2N(O)C_aH_{2a}$— groups to a temperature from 75° C. to 200° C.

20. A process for producing a siloxane containing at least one group represented by the formula:

$$C_aH_{2a-1}SiO_{\frac{3-b}{2}}^{Z''''_b}$$

wherein $a$ has a value of at least three, $b$ has a value from 0 to 2, $Z''''$ is a member selected from the group consisting of the alkoxy, aryloxy, monovalent hydrocarbon, hydroxy and $C_aH_{2a-1}$— groups, said process comprising heating a siloxane containing at least one group represented by the formula:

$$R_2N(O)C_aH_{2a}SiO_{\frac{3-b}{2}}^{Z''_b}$$

wherein R is a monovalent hydrocarbon group, $a$ has a value of at least three, the $R_2N(O)$ group is attached to at least the third carbon atom removed from silicon, $b$ has a value from 0 to 2, and $Z''$ is a member selected from the group consisting of the alkoxy, aryloxy, hydroxy, monovalent hydrocarbon and $R_2N(O)C_aH_{2a}$— groups to a temperature from 75° C. to 200° C.

No references cited.

UNITED STATES PATENT OFFICE
CERTIFICATION OF CORRECTION

Patent No. 2,955,127                                                  October 4, 1960

Roscoe A. Pike

It is hereby certified that error appears in the above numbered patent requiring correction and that the said Letters Patent should read as corrected below.

Column 1, line 61, after the arrow, the right-hand portion of the formula should appear as shown below instead of as in the patent:

$$R_2N(O)C_aH_{2a}Si\equiv$$

column 3, line 75, after "alkenylsilicon" insert -- compounds --; column 5, line 58, column 6, lines 10, 32, and 65, column 8, line 34, and column 9, lines 33 and 48, after "group", each occurrence, insert -- is --.

(SEAL)            Signed and sealed this 1st day of August 1961.
Attest:

ERNEST W. SWIDER
Attesting Officer

DAVID L. LADD
Commissioner of Patents